(12) United States Patent
George

(10) Patent No.: US 8,383,169 B1
(45) Date of Patent: Feb. 26, 2013

(54) HARD OR CHEWABLE CANDIES, BEVERAGE, AND DIETARY SUPPLEMENT CONTAINING KAVA ROOT EXTRACT, LEMON BALM, AND CHAMOMILE

(76) Inventor: Steven T. George, Aiea, HI (US)

( * ) Notice: Subject to any disclaimer, the term of this patent is extended or adjusted under 35 U.S.C. 154(b) by 0 days.

(21) Appl. No.: 13/163,901

(22) Filed: Jun. 20, 2011

Related U.S. Application Data

(63) Continuation-in-part of application No. 12/456,992, filed on Jun. 25, 2009, now abandoned.

(60) Provisional application No. 61/133,660, filed on Jun. 30, 2008.

(51) Int. Cl.
    *A01N 65/00* (2009.01)

(52) U.S. Cl. ....................................................... 424/725

(58) Field of Classification Search ........................ None
    See application file for complete search history.

(56) References Cited

U.S. PATENT DOCUMENTS

| | | | |
|---|---|---|---|
| 5,770,207 | A | 6/1998 | Bewicke |
| 5,976,550 | A | 11/1999 | Engel |
| 6,365,209 | B2 | 4/2002 | Cherukuri |
| 7,214,396 | B2 | 5/2007 | Rivier |
| 2003/0012824 | A1 | 1/2003 | Ott |
| 2003/0013639 | A1 | 1/2003 | Yurchak |
| 2003/0138520 | A1 | 7/2003 | Bell |
| 2005/0220934 | A1 | 10/2005 | Leadbeater |
| 2008/0026099 | A1 | 1/2008 | Stawski |
| 2008/0131532 | A1 | 6/2008 | Leitman |
| 2010/0119653 | A1 | 5/2010 | Hall |
| 2010/0119664 | A1 | 5/2010 | Stawski |
| 2011/0195130 | A1 | 8/2011 | Siegal |

*Primary Examiner* — Michael Meller
(74) *Attorney, Agent, or Firm* — James Creighton Wray

(57) ABSTRACT

A hard or chewable candy, beverage, effervescent powder or tablet, or dietary supplement composition serves as a relaxant and mind energizer. The combination affords the benefit of reduction in the incidence or severity of stomach upset and/or hangover sometimes associated with the primary ingredient, kavalactones. The composition comprises kava root extract and at least one additional component of lemon balm or chamomile extract.

3 Claims, 1 Drawing Sheet

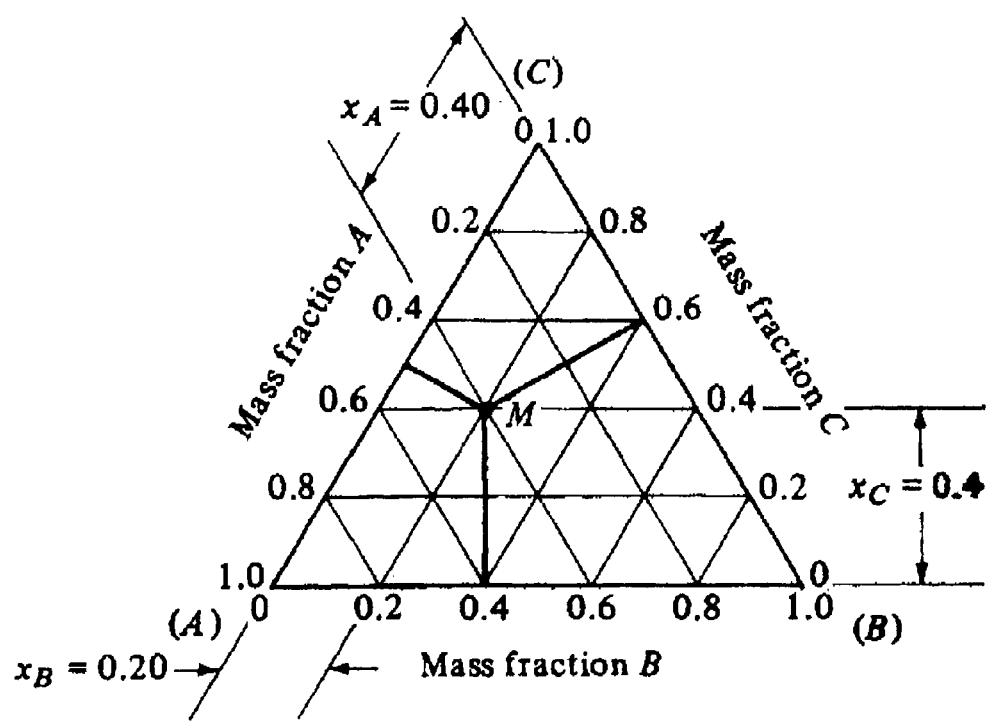

HARD OR CHEWABLE CANDIES, BEVERAGE, AND DIETARY SUPPLEMENT CONTAINING KAVA ROOT EXTRACT, LEMON BALM, AND CHAMOMILE

This application is a continuation-in-part of U.S. patent application Ser. No. 12/456,992, filed Jun. 25, 2009 now abandoned, which claims the benefit of U.S. Provisional Application No. 61/133,660, filed Jun. 30, 2008, which are hereby incorporated by reference in their entireties.

SUMMARY OF THE INVENTION

The present invention relates generally to hard or chewable candies, beverages, dietary supplements, and, more particularly, to a special blend of kava root extract and other ingredients designed to produce general relaxation with maintaining and enhancing mental acuity and reducing incidence or severity of upset stomach and/or hangover associated with the primary ingredient, kava root extract.

The kava plant has been mainly grown on the pacific islands of Hawaii, Vanuatu, America Samoa (and Western Samoa), Tonga, Federated States of Micronesia, and Fiji. With approximately 3000 years of use, Kava extends to medicinal, religious, political, cultural, and social use. Known as the "peace plant", kava's primary benefits are to alleviate stress and anxiety. Over the years, numerous companies have commercialized beverages and dietary supplements containing kava. Very few contain functional dosages, dosages that the consumer can readily feel. None have combined kava with other ingredients for the purpose of reducing the incidence or severity of stomach upset and/or hangover sometimes associated with kava.

Chamomile is a plant of the sunflower family Asteraceae. Other names include *Chamomilla chamomilla, Chamomilla recutita* (accepted name according to the Flora Europaea), *Matricaria suaveolens*, and *Matricaria chamomilla*. Chamomile flowers, in the form of a powdered extract or tea have been traditionally used for its calming effect, and sometimes for treating sore stomachs.

Lemon balm (*Melissa officinalis*) is an herb in the mint family Lamiaceae. Lemon balm has many uses including as a flavoring in teas, beverages, and ice cream. As an herbal preparation it is claimed to have anti-pathogenic effects and a calming effect.

In the present invention hard or chewable candies, beverages, and dietary supplements are provided that comprise kava root extract and at least one additional herb selected from the group consisting of chamomile and lemon balm. The present formulation enhances the general relaxation achieved from the consumption of kavalactone extract alone while having the unexpected benefits of reducing the incidence or severity of stomach upset and/or hangover sometimes associated with the primary ingredient, kava root extract.

The hard or chewable candies of the present invention are orally administered, and which comprise a servings of about 5 to 500 mg of kavalactones, about 1 to 400 mg of lemon balm, and about 1 to 300 mg of chamomile to enhance general relaxation. The candy optionally comprises sugar, corn syrup, water, flavoring and food coloring. The candy comprising sugar and corn syrup is optionally replaced to create a sugar-free substitute.

A batch is comprised of about 2 cups sugar; about ⅔ cups corn syrup; about ¾ cups water; about 2 tsp. flavoring; and about 2-4 drops food coloring. The batch is reduced to yield approximately ninety servings of hard or chewable candy.

This candy is made by the method comprising: mixing sugar, corn syrup and water ingredients; heating the sugar, corn syrup and water ingredients to approximately 200 degrees until the sugar dissolves; mixing kava, lemon balm, and chamomile ingredients with water in a separate bowl; adding kava, lemon balm, and chamomile ingredients to the sugar, corn syrup and water ingredients at approximately 225 degrees; mixing the combined ingredients every 3-5 minutes; adding drops of food coloring when the combined ingredients reach approximately 275 degrees; removing the combined mixture from the heat; adding flavoring to the combined mixture and mixing vigorously; and pouring the mixture into molds shortly thereafter. The method further comprises allowing the combined ingredients to boil until reaching 300 degrees. Alternatively, the method further comprises removing the combined ingredients from the heat after the combined ingredients reach approximately 240 degrees; pouring the mixture into soft ball molds; and wrapping the combined ingredients, wherein the combined ingredients are allowed to cool before wrapping.

The composition of matter comprising an orally administered serving to enhance general relaxation, the serving comprising about 5 to 500 mg of kavalactones derived from kava kava root; about 1 to 400 mg of lemon balm; and about 1 to 300 mg of chamomile. The composition optionally includes a liquid solvent wherein the solvent is reduced or concentrated such that a majority of the liquid solvent is removed. The composition optionally includes an effervescent additive and the serving is dissolvable and reconstituted in water or another liquid, which optionally comprises an effervescent tablet or powder. The composition optionally comprises at least 30 wt % kavalactones. The effervescent additive is optionally selected from the group consisting of citric acid, sodium bicarbonate, flavoring, and combinations thereof.

These and further and other objects and features of the invention are apparent in the disclosure, which include the above and ongoing written specification, with the drawings.

BRIEF DESCRIPTION OF THE DRAWINGS

FIG. 1 shows coordinates for a mass or weight fraction triangular diagram.

DETAILED DESCRIPTION OF THE PREFERRED EMBODIMENTS

The hard or chewable candies, beverage and dietary supplement of the invention comprise kava extract and at least one of the following ingredients: lemon balm and chamomile extract. These additional ingredients provide the unexpected benefits of reducing the incidence or severity of stomach upset and/or hangover sometimes associated with the primary ingredient, kava root extract. Kavalactones can be derived from various sources of kava kava root as it is the amount of kavalactones that are important and not necessarily the exact source of the kavalactones. Kavalactones can come from the following: kava extract powder; carbon dioxide ($CO_2$) supercritical extraction of kava kava root in the form of a paste or powder; or raw or dried kava kava root.

The kava extract can be sourced from a reliable supplier standardized to kavalactone content of about 30 wt %, wherein commercial processes of alcohol or carbon dioxide extraction are generally used. The alcohol extraction solvent can be methyl alcohol, ethyl alcohol, amyl alcohol, acetone or acetic ester diluted or not with water; however, other liquid-liquid alcohol extraction processes are acceptable as well. Carbon dioxide extraction can be, for example, accomplished from the process known as supercritical fluid extraction, wherein the kavalactones are stripped from the kava root by a highly compressed semi-liquid form of carbon dioxide. Pre-streamed kava root is soaked in a bath of supercritical carbon dioxide for several hours, after which time the pressure is reduced and the carbon dioxide is either allowed to evaporate or the pressurized carbon dioxide is allowed to run through either water or charcoal, or an equivalent, to filter the kavalactones. The carbon dioxide may then be used on another batch of kava root. Although liquid works better than water because the carbon dioxide is kept at a supercritical state near the transition from liquid to gas, which combines the favorable diffusivity properties of the gas with increased density of a liquid, this carbon dioxide extraction process is used for illustrative purposes only.

The range of each of the herbs will fall approximately within the range of about 5 to 500 mg for the kava root extract, about 1 to 400 mg for the lemon balm, and about 1 to 300 mg for the chamomile extract. In one commercial preparation, the content for a serving would comprise about 375 mg of kava extract of about 30 wt % kavalactones, 25 mg of chamomile extract, and 100 mg of lemon balm.

FIG. 1 coordinates for a mass or weight fraction triangular diagram. FIG. 1 illustrates how servings may be measured by weight percent (wt %) or mass fractions in relation to other ingredients. For example, where Mass Fraction A is used to represent the weight percent for kavalactones, Mass Fraction B represents the combined weight percent of chamomile and lemon balm, and Mass Fraction C represents the weight percent for the balance of additional ingredients. Point M in FIG. 1 would therefore reflect kavalactones having 40 wt %, chamomile and lemon balm having 20 wt %, and the balance of additional ingredients having a 40 wt %.

In preparing a beverage or a concentrated drink or shot, these ingredients, source typically in powder or oil form can be prepared in water that range in volume from 25 ml to 500 ml per serving. As an example, in addition to water various flavors and sweeteners could be added such as cane juice, ginger juice, stevia, citric acid, fruit flavors, or the like. In a beverage or concentrated drink or shot format, the product would be flash pasteurized during bottling. Alternately, in a concentrated drink or shot format, preservatives could be added.

One embodiment of the present invention may be in the form of edible hard or chewable candies, which may be mixed together with additional ingredients for making the candies.

For example, additional ingredients for an embodiment of edible hard or chewable candies include: 2 cups of sugar; ⅔ cups corn syrup; ¾ cups water: 2 tsp. flavoring; 2-4 drops food coloring; and main ingredients selected from the group consisting of kava kava, lemon balm, and chamomile, wherein the amount of these main ingredients depends upon the type of extract or source used. Alternatively, the hard and chewable candies are made sugar-free by replacing the sugar and corn syrup with Isomalt and a sugar-free substitute (e.g., Sucralose, Rebianna, Acesulfame K, etc.). These ingredients will yield approximately ninety (90) pieces of candy. The serving size is approximately one to five pieces, wherein the active ingredients included will be in the following serving size amounts: about 5 to 500 mg kavalactones derived from kava kava root; about 1 to 400 mg lemon balm; and about 1 to 300 mg chamomile.

In another embodiment, the hard and chewable candies have a pressed tablet and a coating that is used in large-scale industrial manufacturing. The coatings typically have ingredients that are similar to dietary supplement powder and capsule formulations, which also contain the ranges of active ingredients noted above. Preferably, talc and magnesium stearate are used to create the pressed tablet and a coating.

One method for preparing candies that are hard includes the following steps: Combine sugar, corn syrup (or sugar-free substitutes) and ¼ cup water. Slowly heat to 200 degrees until sugar dissolves. In a separate bowl, use a high shear blade and mix kava, lemon balm, and chamomile with the remaining ½ cup water. It is preferable to mix kava, lemon balm, and chamomile separately before adding to mixture to avoid clumping of kavalactones from the kava kava. Add kava, lemon balm, and chamomile mixture to sugar mixture at 225 degrees. Continue mixing every 3-5 minutes. At 275 degrees add drops of food coloring and let the mixture boil until the entire mixture reaches 300 degrees. Remove the heat source and allow the mixture to stop boiling. Once the mixture stops boiling, add flavoring and mix vigorously. The mixtures should preferably be poured into molds shortly thereafter.

Another method for preparing candies that are chewable includes the same method as detailed above, except that the ingredients should be removed from the heat source at 240 degrees. After removal from the heat source, the mixture is poured into soft ball molds which are preferably allowed to cool before wrapping.

In another method, the method further comprises pressing the mixture into a pressed tablet, and sealing the tablet with a coating.

In another embodiment of the composition, the active ingredients are formulated into a dietary supplement in the form of ingestible capsules, which also contain the ranges of active ingredients noted above. Preferably, talc and magnesium stearate are included in one form of the encapsulated dietary supplement.

Another embodiment combines active ingredients that are formulated into a powder drink mix or an effervescent additive in the form of a powder or tablet, which also contains the ranges of active ingredients noted above. This would provide the added convenience of ease of transportability, storage, and consumption. Preferably, the effervescent additive contains citric acid, sodium bicarbonate, and flavoring. Alternately, the effervescence could be achieved with other mineral carbonates including sodium carbonate, sodium bicarbonate, calcium carbonate, calcium bicarbonate, potassium carbonate, and potassium bicarbonate along with alternate organic acids such tartaric acid, fumaric acid, malic acid, adipic acid and sodium salts thereof. An additional benefit and inventive contribution of formulating into an effervescence is that the effervescence reactants provide a further buffering effect against stomach upset that is sometimes associated with kava consumption.

The above embodiments that are reduced are generally concentrated into a composition that has had either all or much of its base component or solvent, in the case of a liquid, removed. Typically this will involve the removal of water from a solution or suspension such as, for example, the removal of water from the active ingredients and main ingredients previously discussed. This reduced or concentrated form has the benefit of a reduction in weight and volume for transportation as the reduced form or concentrate can be reconstituted at the time of usage by the addition of the solvent.

While the invention has been described with reference to specific embodiments, modifications and variations of the invention may be constructed without departing from the scope of the invention, which is defined in the following claims.

The invention claimed is:

1. A candy consisting essentially of about 5 mg-500 mg of kava kava root extract in the total candy, about 1 mg-400 mg of lemon balm extract in the total candy and about 1 mg-300 mg of chamomile extract in the total candy.

2. A candy consisting essentially of about 5 mg-500 mg of kava kava root extract in the total candy, about 1 mg-400 mg of lemon balm extract in the total candy, about 1 mg-300 mg of chamomile extract in the total candy and a sweetener.

3. The candy of claim 1 or 2 in tablet form.

* * * * *